United States Patent
Mayr et al.

(10) Patent No.: US 7,905,249 B2
(45) Date of Patent: Mar. 15, 2011

(54) PROPORTIONAL PRESSURE CONTROL VALVE COMPRISING A PRESSURE JUMP IN THE CHARACTERISTIC P/L CURVE THEREOF

(75) Inventors: Karlheinz Mayr, Bregenz (AT); Thilo Schmidt, Meckenbeuren (DE); Markus Moosmann, Ravensburg (DE)

(73) Assignee: ZF Friedrichsafen AG, Friedrichshafen (DE)

( * ) Notice: Subject to any disclaimer, the term of this patent is extended or adjusted under 35 U.S.C. 154(b) by 774 days.

(21) Appl. No.: 11/908,003

(22) PCT Filed: Mar. 2, 2006

(86) PCT No.: PCT/EP2006/001881
§ 371 (c)(1),
(2), (4) Date: Oct. 26, 2007

(87) PCT Pub. No.: WO2006/094693
PCT Pub. Date: Sep. 14, 2006

(65) Prior Publication Data
US 2008/0272322 A1    Nov. 6, 2008

(30) Foreign Application Priority Data
Mar. 9, 2005   (DE) .......................... 10 2005 010 693

(51) Int. Cl.
*F16K 31/06* (2006.01)
(52) U.S. Cl. ..................................... 137/596.17; 251/77
(58) Field of Classification Search ............. 137/596.17, 137/596.1, 596.2, 625.65, 625.26, 625.27; 251/129.08, 129.19, 77, 337, 322
See application file for complete search history.

(56) References Cited

U.S. PATENT DOCUMENTS

| | | | | |
|---|---|---|---|---|
| 3,527,253 A * | 9/1970 | Harpman | ................ | 137/625.27 |
| 3,791,408 A * | 2/1974 | Saitou et al. | .................. | 137/529 |
| 4,886,091 A * | 12/1989 | Coleman | .................. | 137/625.65 |
| 5,533,249 A * | 7/1996 | Wakeman | ........................ | 29/605 |
| 6,152,422 A * | 11/2000 | Staib et al. | ............... | 251/129.15 |
| 6,328,065 B1 | 12/2001 | Schmid et al. | | |
| 6,899,313 B2 * | 5/2005 | Carrillo et al. | ........... | 251/129.08 |
| 6,904,934 B2 | 6/2005 | Runge et al. | | |
| 6,943,657 B2 * | 9/2005 | Subramanian et al. | ....... | 335/261 |
| 6,989,729 B2 | 1/2006 | Mayr et al. | | |
| 7,021,256 B2 | 4/2006 | Wagner et al. | | |
| 2003/0037825 A1 | 2/2003 | Runge et al. | | |
| 2004/0130421 A1 | 7/2004 | Mayr et al. | | |

FOREIGN PATENT DOCUMENTS

| | | |
|---|---|---|
| DE | 19733660 A1 | 2/1999 |
| DE | 19810241 A1 | 9/1999 |
| DE | 10034959 A1 | 2/2002 |
| DE | 10248181 A1 | 4/2004 |
| DE | 10252431 A1 | 5/2004 |
| DE | 10255414 A1 | 6/2004 |
| DE | 10308143 A1 | 9/2004 |

* cited by examiner

*Primary Examiner* — Craig M Schneider
(74) *Attorney, Agent, or Firm* — Davis & Bujold, P.L.L.C.

(57) ABSTRACT

An electromagnetic proportional pressure-control valve of a vehicle transmission which includes a magnet part, a hydraulic part and a spring operatively connecting the magnet part to the hydraulic part. The magnet part includes a coil, an armature and an armature bar. The hydraulic part includes first and second closing elements. The first closing element forms a flat seat and the second closing element a ball seat and the closing elements are opened and/or closed via a tappet rod. When no current is applied to the valve, the second closing element is closed and an gap (ü) in the first closing element is larger than one seventh a nominal width (NW) of the valve. The second closure area ($A\_2$) is larger than a circular area having a diameter corresponding to double the gap and the diameter (s) of the tappet rod is smaller than 0.7 times the diameter (b) of the orifice.

10 Claims, 4 Drawing Sheets

PROPORTIONAL PRESSURE CONTROL VALVE COMPRISING A PRESSURE JUMP IN THE CHARACTERISTIC P/L CURVE THEREOF

This application is a national stage completion of PCT/EP2006/001881 filed Mar. 2, 2006 which claims priority from German patent application serial no. 10 2005 010 693.5 filed Mar. 9, 2005.

FIELD OF THE INVENTION

The invention relates to a proportional pressure-control valve.

BACKGROUND OF THE INVENTION

In a transmission, particularly an automatic transmission for a motor vehicle, the pressure is usually controlled as needed in the hydraulic circuit. Here the pressure level for the lubricating oil supply of the transmission parts can be kept low. Certain consumers, of course, need at times a pressure above a specific pressure value. During the shifting operations, for ex., the pressure is raised in the hydraulic circuit to make it possible to quickly fill the shifting elements with pressure medium.

For pressure control in hydraulic circuits of motor vehicles pressure control valves are customarily used to regulate control elements for the actuation of clutches. The control elements are controlled with the pressure-control valve by means of a proportional magnet consisting of at least one core, one coil and one armature. The coil current is controlled via the proportional magnet in proportion to the output quantity of power; the magnet armature and thus the element for clutch control are controlled according to the coil current. The pressure-current p/l characteristic curves needed for clutch adjustment are produced from characteristic magnetic power-current characteristic curves of the pressure control valve which is electronhydraulically controlled in the automatic transmission.

From the patent application DE 102 55 414 A1 is, at the same time, known a proportional pressure-control valve consisting of a magnetic part and a hydraulic part. The magnetic part consists at least of one coil, one armature and one core. The armature has here two parts, one first part being firmly connected with an armature bar and one second part being axially moveably arranged upon the armature bar. Both parts of the armature are interconnected by one spring. This design makes an increased gradient of the p/l curve possible. The gradient of the p/l curve is here very flat at low current values and the end of the curve is therefore high. Thereby the supply of pressure through the proportional pressure-control valve can be very precisely adjusted. Some consumers such as clutches in motor vehicles need as the control pressure, a pressure which is always above a first threshold value. Only when a pressure, abuts which is higher than the threshold value is applied, is it possible to control the consumer. The threshold value is called a charge pressure.

If a consumer has to be pressurized with charge pressure before it can be controlled, then a curve according to the prior art with the very flat area of the p/l curve would be needed so as to reach the charge pressure. To the flat gradient of the p/l curve a steep gradient of the curve follows. If now with this curve, the charge pressure of the shifting element must first be reached and only then can the controlling start, the area with steeper gradient, where the pressure can be very precisely controlled, is very much smaller. The shifting element therefore cannot be precisely controlled with such a curve.

The problem on which the invention is based is to make a proportional pressure-control valve which quickly enables the pressure to reach a first threshold valve and then increases the p/l curve.

SUMMARY OF THE INVENTION

Accordingly a proportional pressure-control valve is proposed which consists of one magnetic part and one hydraulic part. The magnetic part consists at least of one coil, one armature and one core, with the armature being firmly connected to an armature bar. The hydraulic part in turn is connected, via a tappet rod, with the armature bar, a springy element being placed between the armature bar and the tappet rod. The tappet rod is firmly connected to one first closing element. The first closing element comprises one seating area which with a first closure area forms a flat seat. The gap between the closure area from the seating area, in currentless state is called the extent of offset. A second closing element is actuated by the tappet rod. This second closing element advantageously has the shape of a ball and forms with a second closure area a ball seat. When seated, the ball closes an orifice through which the pressure medium flows toward the magnetic part. If the proportional pressure-control valve is pressurized with flow, then the tappet rod opens the ball seat. The second closure area, which can be closed by the ball, has a circular area with the diameter of the orifice. In direction of flow, before the flat seat, a cylindrical diameter through which the pressure medium flow is increased. The diameter of this space is called a nominal width of the valve.

To obtain the inventive characteristic curve, the geometry of the hydraulic part now has to be specially designed. According to the invention this is achieved by the fact that in the currentless state, when the ball seat is closed, the gap between the closing are and the seating area is larger than a seventh part of the nominal width. In addition the second closure area must be larger than a circular area having a diameter two times the gap. Besides, the diameter of the part of the tappet rod which projects through the orifice when the ball seat is open has to be smaller than 0.7 times the diameter of the orifice.

According to the invention a proportional pressure-control valve is created which comprises a p/l curve with a pressure jump. The pressure jump results from below a certain current value where the pressure rises from zero to a threshold value which advantageously corresponds to the charge pressure of the consumer. After this pressure jump, the p/l curve has the increased gradient. This means that after the pressure jump the p/l curve has, in the area of lower flow volume, a flat gradient and in the area of high flow volume a steep gradient. Therefore it is possible, with an inventive proportional pressure-control valve, to control a consumer that actuates only when a specific threshold value is exceeded, an accurate adjustment of the pressure on the consumer being made possible after the threshold value is reached.

BRIEF DESCRIPTION OF THE DRAWINGS

The invention is explained by way of example herebelow with reference to the enclosed figures.

The figures represent.

DETAILED DESCRIPTION OF THE PREFERRED EMBODIMENTS

Figure 1:
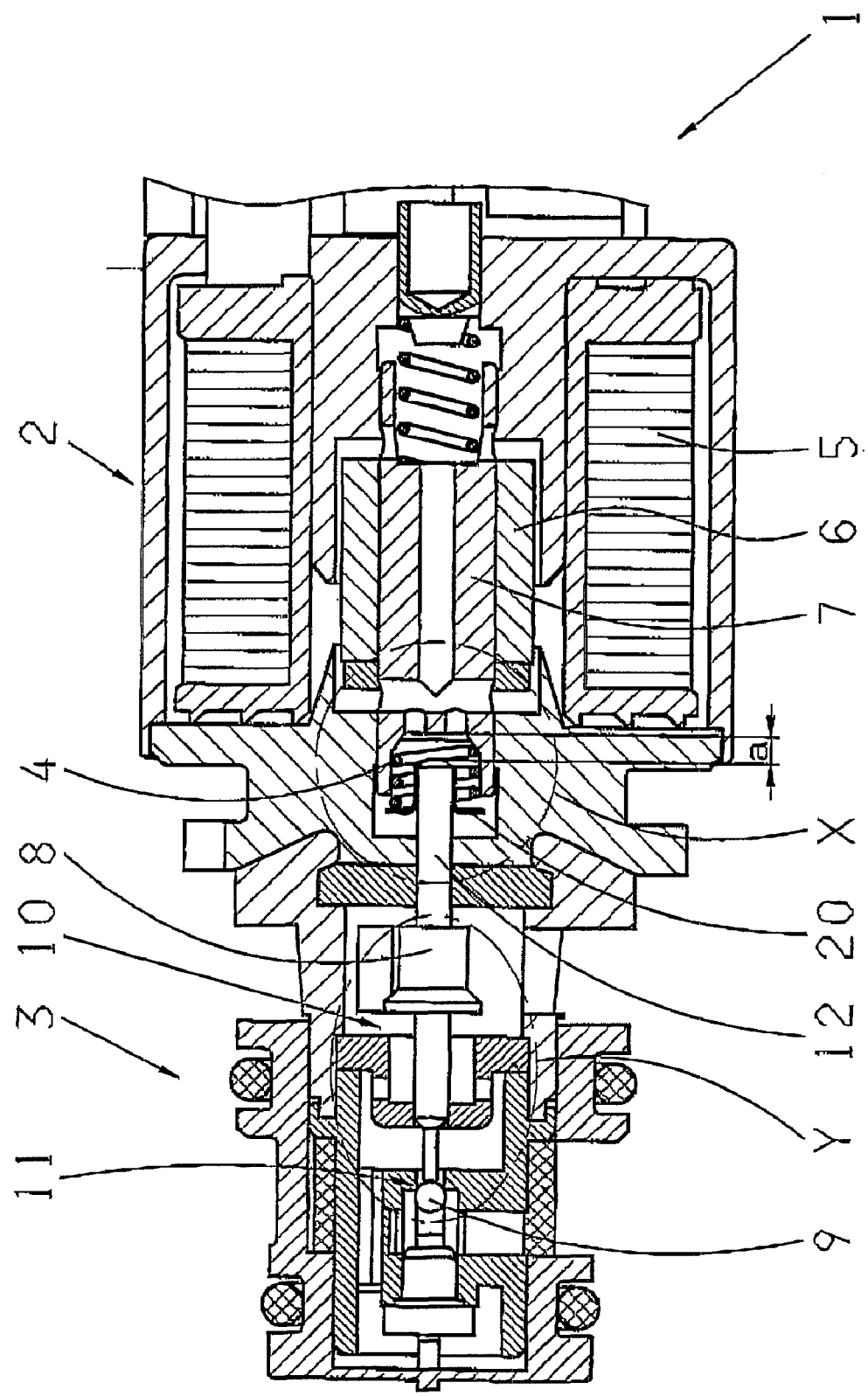
FIG. 1 a partial section through the inventive valve.

According to FIG. 1 the inventive proportional pressure-control valve for controlling a pressure level comprises, one magnetic part 2 and one hydraulic part 3. The magnetic part has at least one coil 5 and one armature 6 which is firmly connected with an armature bar 7. The armature bar 7 is connected, via a springy element 4, with a tappet rod 12. Firmly connected with the tappet rod 12 is a first closing element 8. The first closing element 8 forms with a flat seat 10 a first closure area. The tappet rod 12 also actuates a second closing element 9. This second closing element 9 has the shape of a ball and forms with a ball seat 11 a second closure area. The ball seat 11 closes an orifice 21, through which the pressure medium flows in direction of the magnetic part. If the proportional pressure-control valve 1 is subject to electrical current, the tappet rod 12 opens the ball seat 11. Detailed representations of the two cutouts X and Y are shown in FIGS. 2 and 3.

Figure 2:
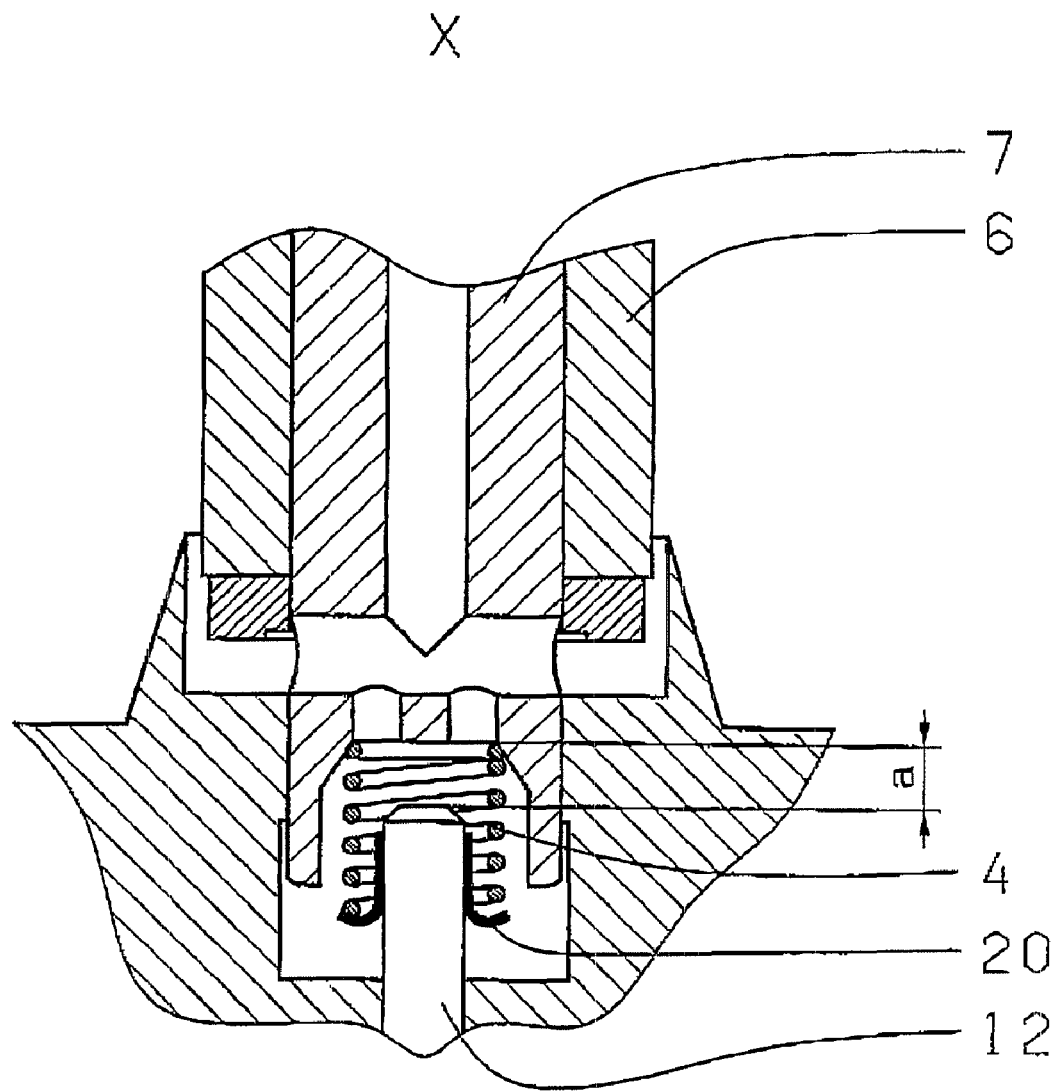
FIG. 2 a partial section through the magnetic part of an inventive valve.

FIG. 2 shows a detailed partial section X of the magnetic part 2. It is to be noted that is the armature 6 is firmly connected with the armature bar 7. In addition an entrainment element 20 is firmly connected with the tappet rod 12. a springy element 4 is located between the entrainment element 20 and the armature bar 7, and is preferably a spring. The entrainment element 20 naturally can also have a different shape such as a purely radial expansion. Moreover, a variable distance a exists between the tappet rod 12 and the armature bar 7. By virtue of the spring arrangement, on one hand, vibrations in the valve 1 are damped and, on the other, a gradient of the p/l curve is reduced when a low electrical current is applied. With this spring coupling between the two parts, the actuation force is transmitted from the magnetic part 2, to the first closing element 8 placed on the tappet rod 12 and is actually reduced. At the same time the space between the armature bar and the tappet rod 7, 12 is reduced. The spring arrangement also considerably reduces the danger of the seat bouncing on the flat seat 10 which occurs due to axial oscillations in the tappet rod 12.

Figure 3:
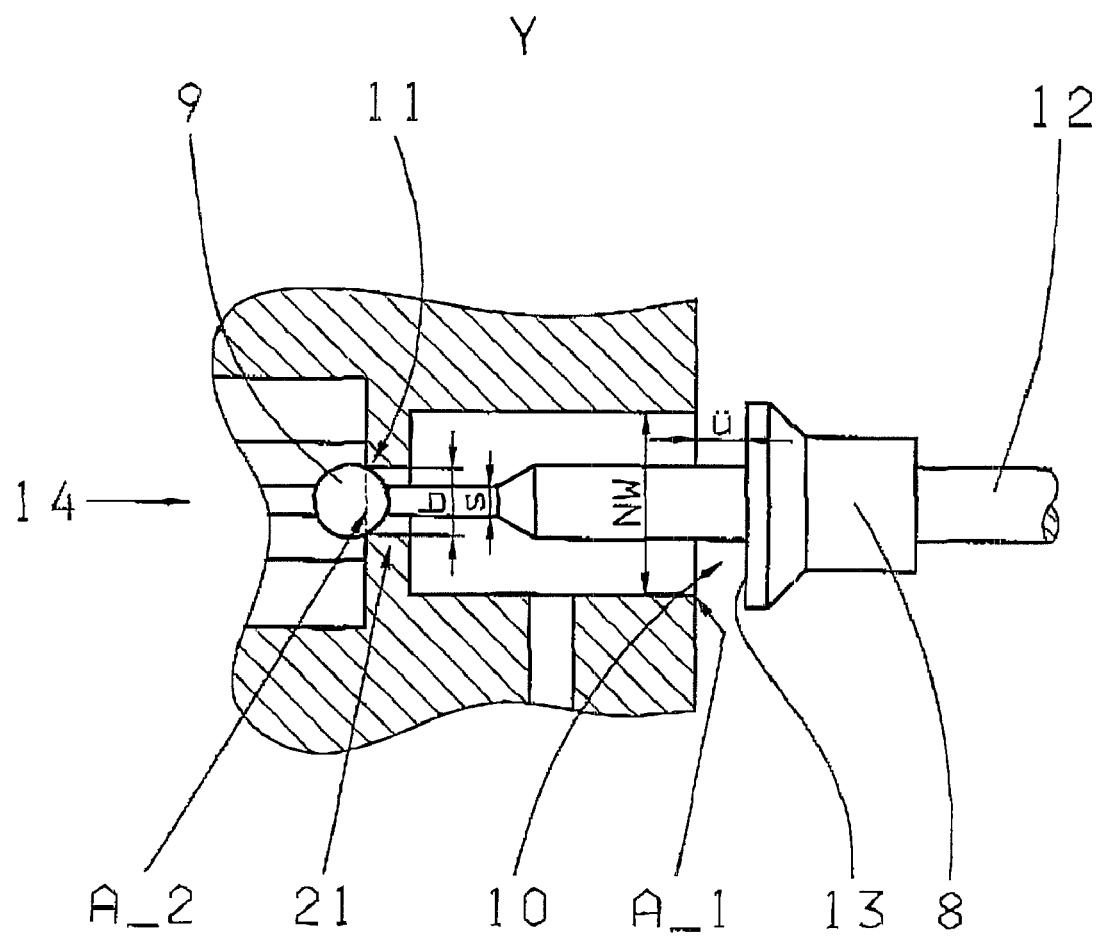
FIG. 3 a partial section through the hydraulic part of an inventive valve.

FIG. 3 shows a detailed partial section Y of the hydraulic part 2 of the valve 1 in a state without electrical current. It is to be noted that the second closing element 9 is ball shaped and has a diameter so as to block the second closure area A_2. The second closure area A_2 forms the end face of the orifice 21 which has a diameter b. FIG. 3 shows also the tappet rod 12 which is firmly connected to the first closing element 8. The tappet rod 12 has on its end facing the second closing element 9 a reduced diameter s which extends into the orifice 21. If the valve 1 is subject to electrical current, the end of the tappet rod with the diameter is further biased into the orifice 21 and moves the second closing element 9 against the flow direction 14 of the pressure medium. Moreover the first closing element 8 has a seat area 13 on its side oriented against the flow direction 14. The seat area 13 forms a flat seat 10 with the first closure area A_1 opposite thereto. The distance from the seat area 13 to the first closure area A_1 corresponds to the flat seat gap ü. The diameter of the cylindrical space which extends from the flat seat 10 and to the second closing element 9 is a nominal width NW.

The hydraulic part 2 of the inventive proportional pressure-control valve 1 is geometrically laid out so that with application of a specific amount of electrical current a pressure jump 17 results in the p/l area 16. To attain this, the following conditions have to be observed:

According to the invention the gap ü must be larger than one seventh of the nominal width NW of the valve:

$$\ddot{u} > \frac{(NW)}{7}$$

In addition the second closure area A_2 must be larger than a circular area having a diameter corresponding to double the overlap ü:

$$A\_2 > \frac{(2\ddot{u})^2 \pi}{4}$$

the same as the reduced diameter s of the tappet rod 12 must be smaller than 0.7 times the diameter b of the orifice 21:

$$s < 0.7 \cdot b$$

This geometrical layout achieves that at a certain current intensity I_1 the issued pressure p of the valve 1 jumps from the value zero to a first pressure value p_1 which more advantageously corresponds to the charge pressure of the consumer.

Figure 4:
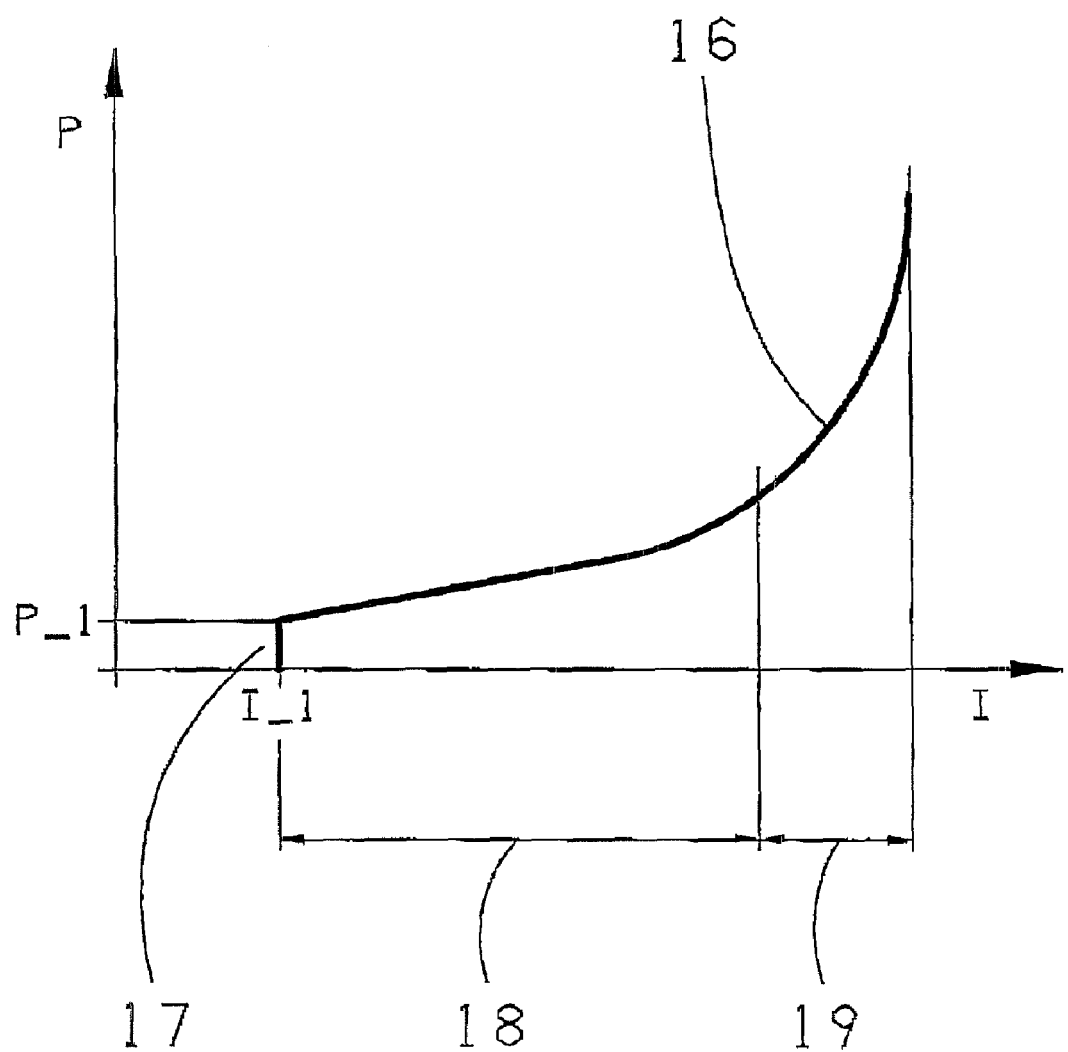
FIG. 4 a p/l curve of an inventive valve.

In FIG. 4 is shown an inventive p/l curve. The pressure p, which is issued by the proportional pressure-control valve 1 to a consumer, is here derived via the current intensity 1 which is applied to the valve 1. The current I rises first up to a specific first current intensity I_1 without the pressure p changing. As soon as the first current intensity I_1 is reached, the pressure p jumps to a first pressure value p_1 which corresponds to the change pressure. The jump is designated as pressure jump 17 which appears at a current value of from 150 to 200 mA, specifically more advantageously at 170 mA. The pressure here rises from 0.2 to 0.7 bar, more advantageously to 0.3 bar. After the pressure jump 17, the p/l curve progressively rises. This means that the p/l curve, in the area of lower current intensity 18 has a small uphill gradient and in the area of higher current intensity 19 a greater one. The uphill gradient of the p/l curve, in the area of lower current intensity 18 amounts by from 0 to 4.0 bar/A, in the area of higher current intensity 19 with up to 16 bar/A.

The pressure jump 17 is advantageous for quickly pressurizing the clutch. In a p/l curve without the pressure jump 17 a large part of the flat curve area would be traversed before the clutch charge pressure p_1 were reached. The flat area of the p/l curve 16 is advantageous for accurate adjustment to a desired pressure. Therefore, an inventive p/l curve 16 with a pressure jump 17 associated with an increased gradient p/l curve is specially advantageous for controlling of a vehicle clutch.

REFERENCE NUMERALS 1 proportional pressure-control valve
2 magnetic part
3 hydraulic part
4 spring
5 magnet coil
6 magnet armature
7 armature bar
8 first closing element
9 second closing element
10 flat seat
11 ball seat
12 tappet rod
13 seat area
14 direction of flow
15
16 p/l curve 17 pressure jump
18 area of low current values
19 area of high current values
20 driving element
21 orifice
a distance
b diameter of orifice
ü overlap
A_1 first closure area
A_2 second closure area
p pressure
p_1 charge pressure
I current intensity
I_1 first current value
NW nominal width
X detailed view of magnetic part
Y detailed view of hydraulic part

The invention claimed is:

1. An electromagnetic proportional pressure-control valve (1) in a vehicle transmission, comprising at least a magnet part (2), a hydraulic part (3) and a spring element (4) in the operative connection between the magnet part (2) and the hydraulic part (3), the magnet part (2) comprises at least one coil (5), an armature (6) and an armature bar (7), and the hydraulic part (3) comprises at least a first closing element (8) and a second closing element (9), the first closing element (8) forms a flat seat (10) which encloses a first aperture and the second closing element (9) forms a ball seat (11), the first closing element (8) and the second closing element (9) are opened and closed via a tappet rod (12), the second closing element (9) is closed when no electricity is applied to the pressure-control valve (1) and a maximum gap (ü) in the flat seat (10) is larger than one seventh of a nominal width (NW) of the first aperture;
    a second closure area (A_2) is larger than a circular area having a diameter corresponding to two times the gap (ü); and
    a diameter(s) of the tappet rod (12) is smaller than 0.7 times a diameter (b) of an orifice (21).

2. The pressure-control valve according to claim 1, wherein the spring element (4) is located between the armature bar (7) and the tappet rod (12) in the magnet part (2) of the pressure-control valve (1).

3. The pressure-control valve according to claim 1, wherein the spring element (4) is clamped between an entrainment element (20) and the armature bar (7), and the entrainment element (20) is fixed to the tappet rod (12).

4. The pressure-control valve according to claim 1, wherein pressure-control valve (1) communicates with a clutch for regulation and control thereof.

5. The pressure-control valve according to claim 1, wherein a gradient of a p/I curve (16) of the pressure-control valve (1) shows a pressure jump (17) from 0 bar to between 0.2 and 0.7 bar.

6. The pressure-control valve according to claim 5, wherein the pressure jump (17) of the p/I curve (16) of the pressure-control valve (1) occurs between 150 mA and 200 mA.

7. The pressure-control valve according to claim 5, wherein, after the pressure jump (17), the p/I curve has a progressive gradient.

8. The pressure-control valve according to claim 5, wherein the pressure jump (17) of the p/I curve, in a region of low current intensity (18), is approximately between 0 to 4.0 bar/A and, in a region of medium to high current intensity (19), is up to 16 bar/A.

9. An electromagnetic proportional pressure-control valve (1) in a vehicle transmission, comprising at least a magnet part (2), a hydraulic part (3) and a spring element (4) in the operative connection between the magnet part (2) and the hydraulic part (3), the magnet part (2) comprises at least one coil (5), an armature (6) and an armature bar (7), and the hydraulic part (3) comprises at least a first closing element (8) and a second closing element (9), the first closing element (8) forms a flat seat (10) which encloses a first aperture and the second closing element (9) forms a ball seat (11), the first closing element (8) and the second closing element (9) are opened and closed via a tappet rod (12), the second closing element (9) is closed when no electricity is applied to the pressure-control valve (1) and a maximum gap (ü) in the flat seat (10) is larger than one seventh of a nominal width (NW) of the first aperture;
    a second closure area (A_2) is larger than a circular area having a diameter corresponding to two times the gap (ü);
    a diameter (s) of the tappet rod (12) is smaller than 0.7 times a diameter (b) of an orifice (21); and
    the diameter (s) of the tappet rod (12) adjacent the ball seat (11) is less than a diameter of the tappet rod (12) adjacent the flat seat (10).

10. An electromagnetic proportional pressure-control valve (1) comprising:
    at least one coil (5), an armature (6) and an armature bar (7), and the armature bar (7) is fixed to the armature (6) which is axially slidable within the at least one coil;
    a first closing element (8) and a second closing element (9) are fixed to a tappet (12) which axially slides within a passage, the first closing element (8) has a seating surface (13) which prevents a flow of pressure medium through a first aperture at a first end of the passage, the second closing element (9) has a seating surface (10) which prevents the flow of the pressure medium through a second aperture (21) at a second end of the passage, a maximum distance (ü) between the seating surface (13) of the first closing element (8) and the first aperture is greater than one seventh of a diameter (NW) of the first aperture, a diameter (b) of the second aperture (A_2) is greater than twice a maximum distance (ü) between the seating surface (13) of the first closing element (8) and the first aperture, a diameter (s) of a section of the tappet (12) extending through the second aperture (A_2) is seven tenths of the diameter (b) of the second aperture (A_2);
    a spring (4) actively unites the armature bar (7) and the tappet (12) such that when an electrical current is applied to the coil (5), the armature bar (7) and the tappet (12) axially slide and bias the first closing element (8) to prevent the flow of the pressure medium through the first aperture and bias the second closing element (9) to enable the flow of the pressure medium through the second aperture (A_2), and when the electrical current is not applied to the coil (5), the armature bar (7) and the tappet (12) axially slide and bias the first closing element (8) to enable the flow of the pressure medium through the first aperture and bias the second closing element (9) to prevent the flow of the pressure medium through the second aperture (A_2).

* * * * *